(12) United States Patent
Kato (10) Patent No.: US 9,598,069 B2
(45) Date of Patent: Mar. 21, 2017

(54) DEVICE AND METHOD FOR CONTROLLING LIMITED SLIP DIFFERENTIAL

(71) Applicant: JTEKT Corporation, Osaka-shi (JP)

(72) Inventor: Tomoaki Kato, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 49 days.

(21) Appl. No.: 14/810,639

(22) Filed: Jul. 28, 2015

(65) Prior Publication Data

US 2016/0039403 A1 Feb. 11, 2016

(30) Foreign Application Priority Data

Aug. 7, 2014 (JP) ................. 2014-161238

(51) Int. Cl.
*B60W 10/02* (2006.01)
*B60W 10/119* (2012.01)
(Continued)

(52) U.S. Cl.
CPC .......... *B60W 10/119* (2013.01); *B60T 8/175* (2013.01); *B60W 10/16* (2013.01);
(Continued)

(58) Field of Classification Search
CPC ............... B60W 10/02; B60W 10/119; B60W 10/12–10/16; B60W 10/184; B60W 30/186; B60W 2510/0291; B60W 30/0604; B60W 2510/0604; B60W 2510/18; B60W 2540/10; B60W 2710/125

See application file for complete search history.

(56) References Cited

U.S. PATENT DOCUMENTS 8,311,717 B2 * 11/2012 Eberhard ........... B60K 23/0808
477/76
9,022,158 B2 * 5/2015 Mita .................... B60K 17/34
180/233
(Continued)

FOREIGN PATENT DOCUMENTS

JP          2003-231428           8/2003

*Primary Examiner* — Ramya Burgess
*Assistant Examiner* — David Morris
(74) *Attorney, Agent, or Firm* — Oblon, McClelland, Maier & Neustadt, L.L.P.

(57) ABSTRACT

In a control device for a limited slip differential that limits a differential operation of front and rear wheels of a four-wheel-drive vehicle having mounted thereon a vehicle behavior control device that controls a braking force, an ECU that controls a torque coupling as the limited slip differential includes: a differential limiting force calculating device that calculates target torque of the torque coupling based on a vehicle traveling state; a differential limiting force correcting device that makes a correction to reduce the target torque based on a command from the vehicle behavior control device; and a thermal load calculating device that calculates a thermal load of the torque coupling. The differential limiting force correcting device limits the correction of the target torque based on the command from the vehicle behavior control device, when the thermal load of the torque coupling is equal to or larger than a predetermined value.

11 Claims, 9 Drawing Sheets

(51) Int. Cl.
*B60T 8/175* (2006.01)
*B60W 10/184* (2012.01)
*B60W 40/12* (2012.01)
*B60W 10/16* (2012.01)
*B60W 30/02* (2012.01)
*B60W 30/186* (2012.01)
*B60K 23/04* (2006.01)
*B60K 23/08* (2006.01)

(52) U.S. Cl.
CPC .......... *B60W 10/184* (2013.01); *B60W 30/02* (2013.01); *B60W 30/186* (2013.01); *B60W 40/12* (2013.01); *B60K 23/04* (2013.01); *B60K 23/0808* (2013.01); *B60T 2201/14* (2013.01); *B60W 10/02* (2013.01); *B60W 2300/18* (2013.01); *B60W 2400/00* (2013.01); *B60W 2510/0291* (2013.01); *B60W 2510/0604* (2013.01); *B60W 2510/12* (2013.01); *B60W 2510/18* (2013.01); *B60W 2520/263* (2013.01); *B60W 2540/10* (2013.01); *B60W 2540/12* (2013.01); *B60W 2710/125* (2013.01)

(56) References Cited

U.S. PATENT DOCUMENTS

| | | | |
|---|---|---|---|
| 9,187,075 B2 * | 11/2015 | Grain | B60W 10/06 |
| 2009/0318265 A1 * | 12/2009 | Ginther | B60W 10/02 |
| | | | 477/181 |
| 2014/0058638 A1 * | 2/2014 | Taniguchi | B60W 10/06 |
| | | | 701/69 |
| 2015/0258889 A1 * | 9/2015 | Sarai | B60K 23/0808 |
| | | | 701/69 |

\* cited by examiner

DEVICE AND METHOD FOR CONTROLLING LIMITED SLIP DIFFERENTIAL

INCORPORATION BY REFERENCE

The disclosure of Japanese Patent Application No. 2014-161238 filed on Aug. 7, 2014 including the specification, drawings and abstract, is incorporated herein by reference in its entirety.

BACKGROUND OF THE INVENTION

1. Field of the Invention

The present invention relates to devices and methods for controlling a limited slip differential capable of limiting the differential operation of front and rear wheels of a four-wheel-drive vehicle.

2. Description of the Related Art

Conventionally, four-wheel-drive vehicles are known in the art which include a limited slip differential capable of limiting the differential operation of front and rear wheels of the four-wheel-drive vehicle and a vehicle behavior control device that controls behavior of the vehicle by applying a braking force.

For example, a four-wheel-drive vehicle described in paragraph [0073] of Japanese Patent Application Publication No. 2003-231428 (JP 2003-231428 A) includes a driving force distribution controller that controls distribution of a driving force to front and rear wheels, and a stability controller that controls behavior of the vehicle by applying a braking force. The driving force distribution controller controls distribution of the driving force to the front and rear wheels by controlling an engaging force of a clutch inserted in a driving force transmission path from an engine serving as a driving source to the front wheels serving as driven wheels.

If the engaging force of the clutch is increased by the control of the driving force distribution controller, the four-wheel-drive vehicle is switched to a four-wheel-drive state where a differential operation of the front and rear wheels is limited. However, if this clutch is disengaged, the differential operation of the front and rear wheels is no longer limited, and the four-wheel-drive vehicle is switched to a two-wheel-drive state where the driving force of the driving source is transmitted only to the rear wheels serving as main driving wheels. For example, if differential rotation between the front and rear wheels increases due to slipping of the front or rear wheels, the driving force distribution controller increases the engaging force of the clutch to switch the drive state to the four-wheel-drive state, thereby suppressing the slipping.

When the stability controller is performing vehicle behavior stabilization control, the driving force distribution controller limits the engaging force of the clutch according to the magnitude of the applied braking force. This suppresses interference between the control by the driving force distribution controller and the control by the stability controller.

For example, when a vehicle is traveling on a low μ road such as a gravel road, the differential rotation between the front and rear wheels tends to increase, and the drive state is more frequently switched to the four-wheel-drive state. If such vehicle behavior stabilization control is performed when the four-wheel-drive vehicle described in JP 2003-231428 A is in the four-wheel-drive state, the engaging force of the clutch is limited according to the braking force. Accordingly, frictional members of the clutch may frictionally slide on each other, and frictional heat may be generated by this frictional sliding. If a thermal load increases due to the heat generated in the clutch, the clutch may be kept in a disengaged state (two-wheel-drive state) until the temperature of the clutch decreases to a predetermined value or lower, in order to protect the clutch from being damaged by overheat.

In such a case, even if differential rotation between the front and rear wheels increases due to slipping of the main driving wheels, the drive state cannot be switched to the four-wheel-drive state, which reduces traveling stability on a low μ road.

SUMMARY OF THE INVENTION

It is an object of the present invention to provide a control device for a limited slip differential which can suppress an increase in thermal load of the limited slip differential that limits a differential operation of front and rear wheels in a four-wheel-drive vehicle having mounted thereon a vehicle behavior control device that controls behavior of the vehicle by controlling a braking force, and a control method for controlling the limited slip differential.

According to one aspect of the present invention, a control device for a limited slip differential, which is mounted on a vehicle including a vehicle behavior control device that controls behavior of the vehicle by controlling a braking force that is applied to front and rear wheels, and the limited slip differential that limits a differential operation of the front and rear wheels, and which controls the limited slip differential, includes: a differential limiting force calculating device that calculates a target value of a differential limiting force that limits the differential operation of the front and rear wheels based on a vehicle traveling state; a differential limiting force correcting device that makes a correction to reduce the target value of the differential limiting force calculated by the differential limiting force calculating device, based on a command from the vehicle behavior control device; and a thermal load calculating device that calculates a thermal load of the limited slip differential. In the control device, the differential limiting force correcting device limits the correction of the target value of the differential limiting force based on the command from the vehicle behavior control device, when the thermal load calculated by the thermal load calculating device is equal to or larger than a predetermined value.

In the above aspect, an increase in thermal load of the limited slip differential that limits the differential operation of the front and rear wheels can be suppressed in the four-wheel-drive vehicle having the vehicle behavior control device mounted thereon.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
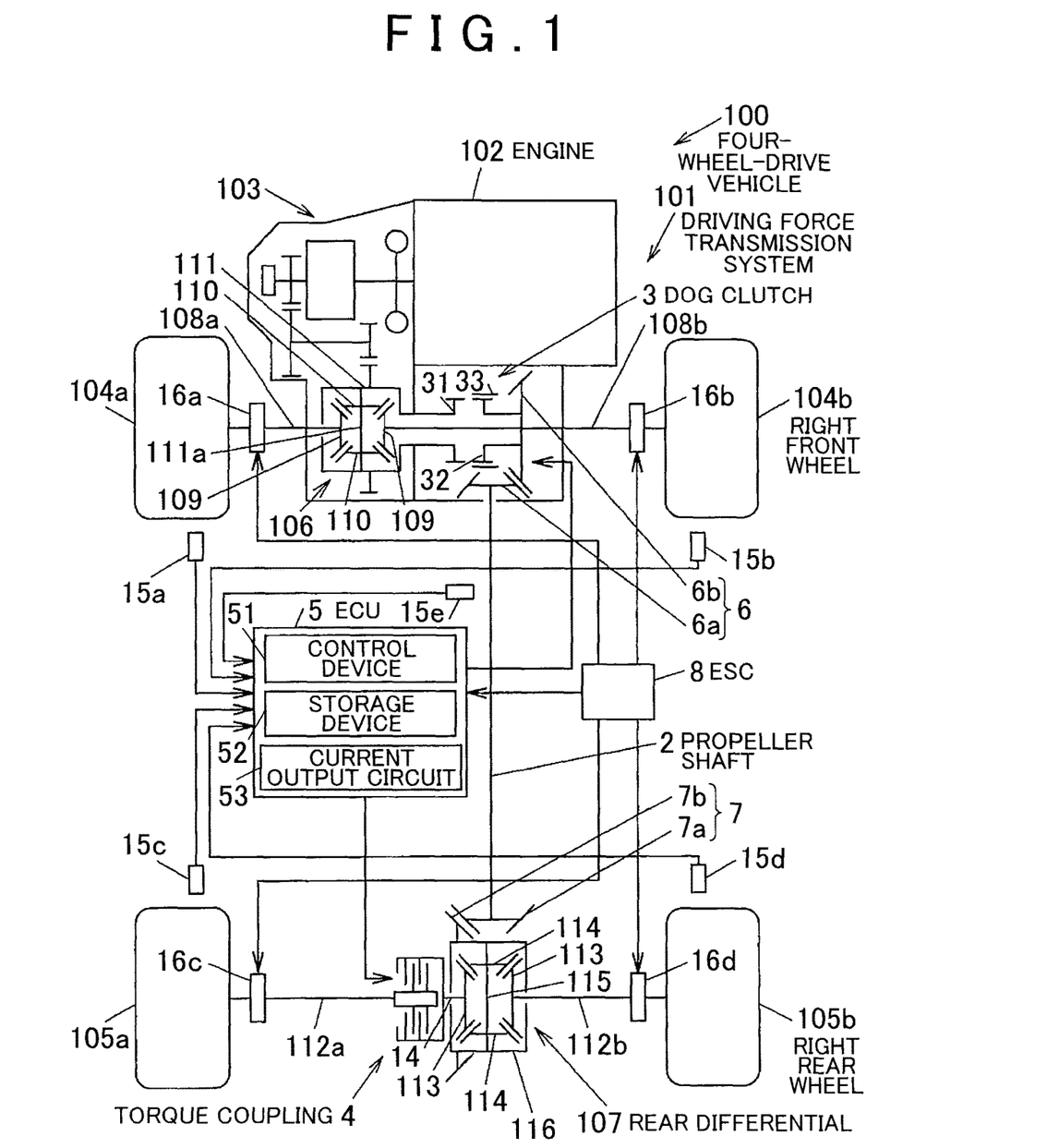
FIG. 1 is a diagram schematically showing an example of the configuration of a four-wheel-drive vehicle having mounted thereon a control device for a limited slip differential according to a first embodiment of the present invention.
Figure 4A:
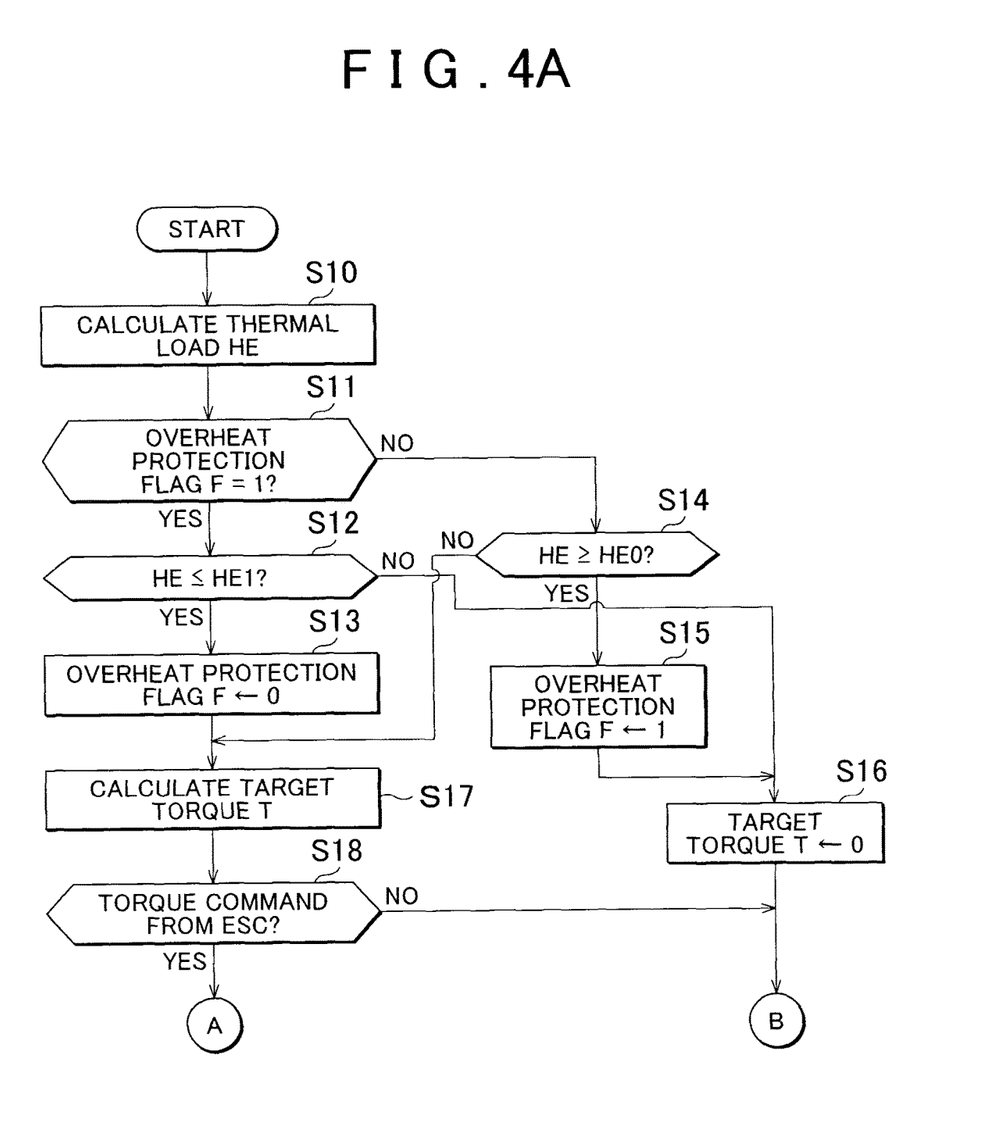
FIG. 4A and FIG. 4B is a flowchart showing processing of the ECU according to the first embodiment.
Figure 4B:
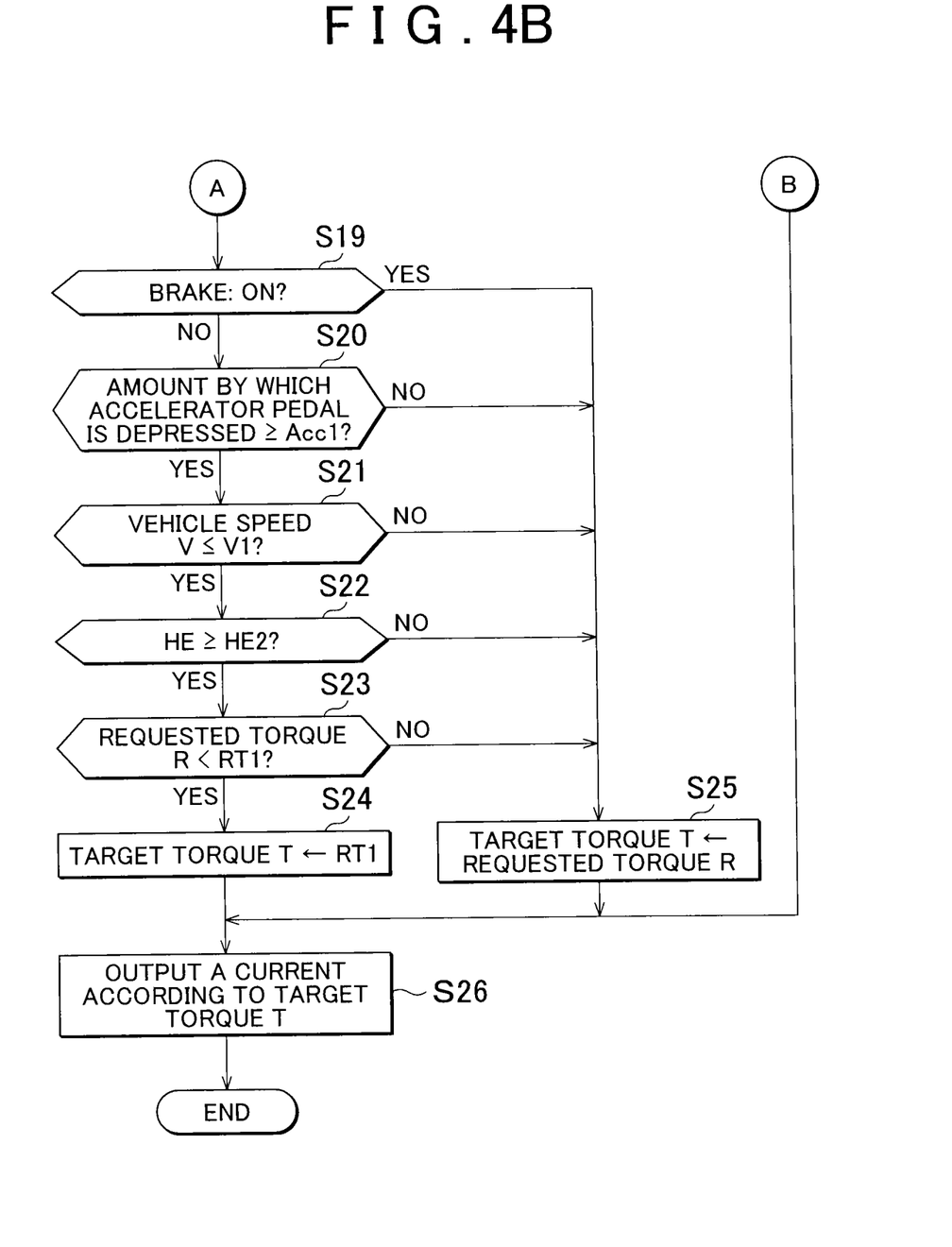

A first embodiment of the present invention will be described with reference to FIG. 1 or 4. FIG. 1 is a diagram schematically showing an example of the configuration of a four-wheel-drive vehicle having mounted thereon a control device for a limited slip differential according to the embodiment of the present invention.

As shown in FIG. 1, a four-wheel-drive vehicle 100 includes an engine 102, right and left front wheels 104b, 104a, and right and left rear wheels 105b, 105a. The engine 102 is a driving source that generates torque for traveling. The front wheels 104b, 104a are a pair of right and left main drive wheels to which the driving force of the engine 102 is constantly transmitted. The rear wheels 105b, 105a are a pair of right and left auxiliary drive wheels to which the driving force of the engine 102 is transmitted according to the traveling state.

The four-wheel-drive vehicle 100 can switch between a four-wheel-drive state and a two-wheel-drive state. In the four-wheel-drive state, the driving force of the engine 102 is transmitted to the right and left front wheels 104b, 104a and the right and left rear wheels 105b, 105a. In the two-wheel-drive state, the driving force of the engine 102 is transmitted only to the right and left front wheels 104b, 104a. The right and left front wheels 104b, 104a (the right front wheel 104b and the left front wheel 104a) are sometimes collectively referred to as the "front wheels 104." The right and left rear wheels 105b, 105a (the right rear wheel 105b and the left rear wheel 105a) are sometimes collectively referred to as the "rear wheels 105."

The four-wheel-drive vehicle 100 has mounted thereon as a driving force transmission system 101 a propeller shaft 2, a dog clutch 3, and a torque coupling 4. The propeller shaft 2 is a driving force transmitting shaft that transmits torque from the engine 102 toward the right and left rear wheels 105b, 105a. The dog clutch 3 is provided between the propeller shaft 2 and the engine 102. The torque coupling 4 is a limited slip differential and is provided between the propeller shaft 2 and the left rear wheel 105a.

The four-wheel-drive vehicle 100 has further mounted thereon an electric control unit (ECU) 5 and a stability controller (ESC) 8. The ECU 5 is a control device that controls the dog clutch 3 and the torque coupling 4. The ESC 8 is a vehicle behavior control device that controls behavior of the four-wheel-drive vehicle 100 by controlling the braking force that is applied to the right and left front wheels 104b, 104a and the right and left rear wheels 105b, 105a.

The four-wheel-drive vehicle 100 switches to the four-wheel-drive state when the driving force is transmitted by both the dog clutch 3 and the torque coupling 4, and switches to the two-wheel-drive state when the driving force is not transmitted by at least one of the dog clutch 3 and the torque coupling 4. In order to reduce traveling resistance to improve fuel economy performance, the ECU 5 of the present embodiment cuts off transmission of the driving force by the dog clutch 3 and the torque coupling 4 in the two-wheel-drive state, and stops rotation of the propeller shaft 2 during traveling in the two-wheel drive state.

Torque of the engine 102 is transmitted to the right and left front wheels 104b, 104a via a transmission 103, a front differential 106, and right and left front wheel drive shafts 108b, 108a. The front differential 106 has a pair of side gears 109, a pair of pinion gears 110, a pinion gear shaft 111a, and a front differential case 111. The pair of side gears 109 are coupled to the right and left front wheel drive shafts 108b, 108a so as not to be rotatable relative to the right and left front wheel drive shafts 108b, 108a. The pair of pinion gears 110 mesh with the pair of side gears 109 such that gear shafts of the pair of pinion gears 110 extend perpendicularly to those of the pair of side gears 109. The pinion gear shaft 111a supports the pair of pinion gears 110. The front differential case 111 accommodates the pair of side gears 109, the pair of pinion gears 110, and the pinion gear shaft 111a.

The torque of the engine 102 is transmitted to the propeller shaft 2 via the transmission 103, the front differential case 111 of the front differential 106, the dog clutch 3, and a front wheel-side gear mechanism 6. The torque of the engine 102 which has been transmitted to the propeller shaft 2 is further transmitted to the right and left rear wheels 105b, 105a via a rear wheel-side gear mechanism 7, a rear differential 107, the torque coupling 4, and right and left rear wheel drive shafts 112b, 112a.

The rear differential 107 has a pair of side gears 113, a pair of pinion gears 114, a pinion gear shaft 115, and a rear differential case 116. The pair of pinion gears 114 mesh with the pair of side gears 113 such that gear shafts of the pair of pinion gears 114 extend perpendicularly to those of the pair of side gears 113. The pinion gear shaft 115 supports the pair of pinion gears 114. The rear differential case 116 accommodates the pair of side gears 113, the pair of pinion gears 114, and the pinion gear shaft 115. A side gear shaft 14 is coupled to the left side gear 113 of the pair of side gears 113 so as not to be rotatable relative to the left side gear 113. The right rear wheel drive shaft 112b is coupled to the right side gear 113 of the pair of side gears 113 so as not to be rotatable relative to the right side gear 113.

A pinion gear 6a is coupled to an end of the propeller shaft 2 which is located on the upstream side (the engine 102 side) of a torque transmission path, and a pinion gear 7a is coupled to an end of the propeller shaft 2 which is located on the downstream side (the right and left rear wheel 105a, 105b side) of the torque transmission path. The pinion gear 6a meshes with a ring gear 6b serving as an output member of the dog clutch 3. The pinion gear 7a meshes with a ring gear 7b fixed to the rear differential case 116. The pinion gear 6a and the ring gear 6b form the front wheel-side gear mechanism 6, and the pinion gear 7a and the ring gear 7b form the rear wheel-side gear mechanism 7.

The dog clutch 3 has a first rotary member 31, a second rotary member 32, and a sleeve 33. The first rotary member 31 is fixed to an end in the axial direction of the front differential case 111. The second rotary member 32 is fixed to the ring gear 6b of the gear mechanism 6. The sleeve 33 can advance and withdraw along rotation axes of the first rotary member 31 and the second rotary member 32 by an actuator, not shown. When the sleeve 33 of the dog clutch 3 meshes with both the first rotary member 31 and the second rotary member 32, the first and second rotary members 31, 32 are coupled together so as not to be rotatable relative to each other. When the sleeve 33 does not mesh with one of the first and second rotary members 31, 32, the first and second rotary members 31, 32 are decoupled from each other.

Rotational speed sensors 15a to 15e are connected to the ECU 5. The rotational speed sensors 15b, 15a detect the rotational speeds of the right and left front wheels 104b, 104a. The rotational speed sensors 15d, 15c detect the rotational speeds of the right and left rear wheels 105b, 105a. The rotational speed sensor 15e detects the rotational speed of the propeller shaft 2.

The four-wheel-drive vehicle 100 further includes brake devices 16b, 16a corresponding to the right and left front wheels 104b, 104a, and brake devices 16d, 16c corresponding to the right and left rear wheels 105b, 105a. For example, each of the brake devices 16a to 16d includes a brake rotor and a brake caliper having brake pads sandwiching the brake rotor therebetween. The brake devices 16a to 16d can individually control the braking force for each wheel by varying the pressure of brake oil that is supplied to the brake caliper. The brake devices 16a to 16d may be electromagnetic brakes that generate a braking force by an electric actuator.

The ESC 8 has a function to stabilize vehicle behavior by controlling the braking force of the brake devices 16a to 16d in case of understeer, oversteer, etc. during traveling on a low μ road or during turning at high speed. The ESC 8 further has an antilock braking function to adjust the braking force during braking operation by the driver to suppress locking of the right and left front wheels 104b, 104a and the right and left rear wheels 105b, 105a.

Figure 2:
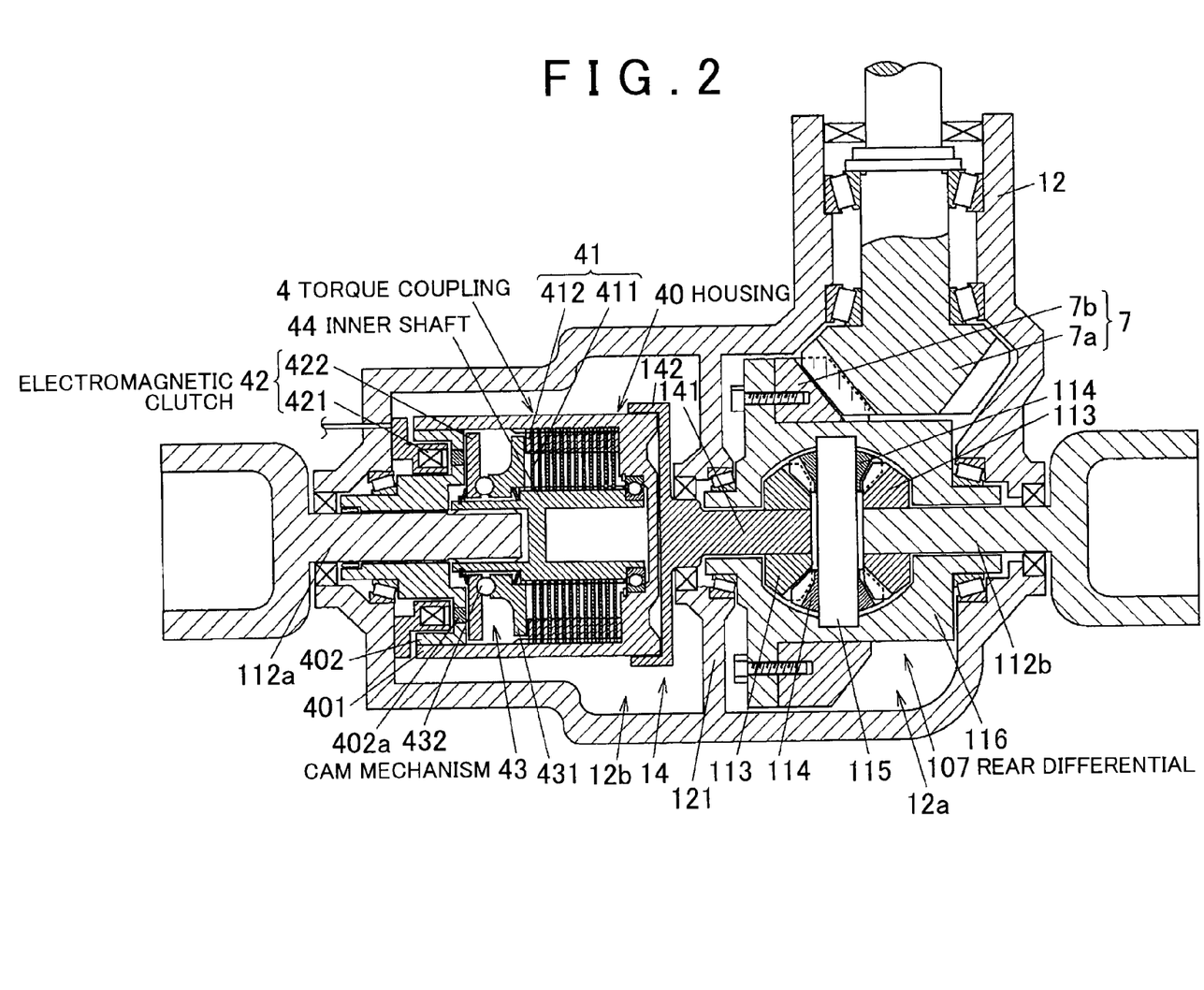
FIG. 2 is a schematic configuration diagram showing a torque coupling and its surrounding area according to the first embodiment.

FIG. 2 is a diagram schematically showing an example of the configuration of the torque coupling 4 and its surrounding area. The torque coupling 4 has a multiple disc clutch 41, an electromagnetic clutch 42, a cam mechanism 43, an inner shaft 44, and a housing 40 accommodating these components. The torque coupling 4 together with the rear differential 107 and the gear mechanism 7 is accommodated in a differential carrier 12.

The space in the differential carrier 12 is divided into first and second spaces 12a, 12b by a partition wall 121, and each of the first and second spaces 12a, 12b is sealed with liquid therein. The first space 12a containing the gear mechanism 7 and the rear differential 107 is filled with differential oil, not shown, suitable for lubricating gears at a predetermined filling factor. The second space 12b containing the torque coupling 4 is filled with lubricating oil, not shown, suitable for lubricating inner clutch plates 411 and outer clutch plates 412 at a predetermined filling factor.

The side gear shaft 14 is a single-piece member formed by a shaft member 141 and a flange portion 142. The shaft member 141 has its one end coupled to the first side gear 113 of the rear differential 107, and the flange portion 142 is provided at the other end of the shaft member 141. The shaft member 141 is inserted through a hole in the partition wall 121. The torque coupling 4 can adjust the amount of torque that is transmitted between the side gear shaft 14 and the left rear wheel drive shaft 112a.

The housing 40 of the torque coupling 4 is formed by first and second housing members 401, 402 that are coupled so as not to be rotatable relative to each other. The first housing member 401 has a cylindrical shape, and the second housing 402 is disposed so as to close a first end of the first housing member 401. The first housing member 401 is coupled to the side gear shaft 14 so as not to be rotatable relative to the side gear shaft 14.

The multiple disc clutch 41 is disposed between the first housing member 401 of the housing 40 and the cylindrical inner shaft 44. The multiple disc clutch 41 is formed by the inner clutch plates 411 and the outer clutch plates 412. The inner clutch plates 411 spline-engage with the outer peripheral surface of the inner shaft 44 so as not to be rotatable relative to the inner shaft 44. The outer clutch plates 412 spline-engage with the inner peripheral surface of the first housing member 401 so as not to be rotatable relative to the first housing member 401. The inner shaft 44 is coupled to the left rear wheel drive shaft 112a by spline-fitting so as not to be rotatable relative to the left rear wheel drive shaft 112a.

The electromagnetic clutch 42 has an annular electromagnetic coil 421 and an armature cam 422 and is placed on the rotation axis of the housing 40. The electromagnetic clutch 42 moves the armature cam 422 toward the electromagnetic coil 421 by an electromagnetic force that is generated by the electromagnetic coil 421, and frictionally slides the armature cam 422 on the second housing member 402. The second housing member 402 has a nonmagnetic ring 402a in its central portion in the radial direction. The nonmagnetic ring 402a is made of a nonmagnetic material and prevents a short-circuit of magnetic flux that is generated when a current is applied to the electromagnetic coil 421.

The cam mechanism 43 includes the armature cam 422 serving as a cam member, and has a main cam 431 and a spherical cam follower 432. The main cam 431 is placed next to the armature cam 422 along the rotation axis of the housing 40, and the cam follower 432 is interposed between the main cam 431 and the armature cam 422. When a current is applied to the electromagnetic coil 421, the cam mechanism 43 receives by the armature cam 422 a rotating force from the housing 40, and converts the rotating force to a pressing force that will serve as a clutch force of the multiple disc clutch 41. As the amount of current that is applied to the electromagnetic coil 421 increases, the frictional force between the armature cam 422 and the second housing member 402 increases accordingly, and the main cam 431 more firmly presses the multiple disc clutch 41. That is, the torque coupling 4 can variably control the pressing force to the multiple disc clutch 41 according to the amount of current that is applied to the electromagnetic coil 421, and can adjust the amount of torque that is transmitted between the side gear shaft 14 and the left rear wheel drive shaft 112a.

If a sufficiently large amount of torque is transmitted by the torque coupling 4 and the side gear shaft 14 and the left rear wheel drive shaft 112a rotate together, the left rear wheel drive shaft 112a and the propeller shaft 2 are coupled together via the gear mechanism 7, the rear differential 107, the side gear shaft 14, and the torque coupling 4 so that torque can be transmitted therebetween, and the right rear wheel drive shaft 112b and the propeller shaft 2 are coupled together via the gear mechanism 7 and the rear differential 107 so that torque can be transmitted therebetween.

If the torque transmission by the torque coupling 4 is cut off and the side gear shaft 14 and the left rear wheel drive shaft 112a are decoupled from each other, the torque from the propeller shaft 2 is no longer transmitted to the left rear wheel drive shaft 112a, and the torque from the propeller shaft 2 is no longer transmitted to the right rear wheel drive shaft 112b accordingly. The reason why the torque from the propeller shaft 2 is no longer transmitted to the right rear wheel drive shaft 112b as well is due to characteristics of common differential gears in which no torque is transmitted to a second side gear as well when a first side gear spins free.

The torque coupling 4 can thus continuously adjust the torque that is transmitted between the propeller shaft 2 and the right and left rear wheels 105b, 105a by varying the amount of torque that is transmitted by the torque coupling 4. When the dog clutch 3 is in the coupled state and the inner clutch plates 411 frictionally engage with the outer clutch plates 412 in the multiple disc clutch 41, the differential operation of the front wheels 104 (right and left front wheels 104b, 104a) and the rear wheels 105 (right and left rear wheels 105b, 105a) is limited. That is, as the torque that is transmitted by the multiple disc clutch 41 increases, an increase in difference between the mean rotational speed of the right and left front wheels 104b, 104a and the mean rotational speed of the right and left rear wheels 105b, 105a (difference in rotational speed between the front and rear wheels) is suppressed. If the inner clutch plates 411 fully frictionally engage with the outer clutch plates 412, the four-wheel-drive vehicle 100 switches to a directly-coupled four-wheel-drive state.

As described above, the torque coupling 4 functions as a limited slip differential capable of limiting the differential operation of the front and rear wheels 104, 105. That is, the frictional force that is generated between the plurality of inner clutch plates 411 and the plurality of outer clutch plates 412 in the multiple disc clutch 41 of the torque coupling 4 serves as a differential limiting force that limits the differential operation of the front and rear wheels 104, 105.

As shown in FIG. 1, the ECU 5 has a control device 51, a storage device 52, and a current output circuit 53. The control device 51 is comprised of an arithmetic circuit including a central processing unit (CPU). The storage device 52 is comprised of a storage element such as a read only memory (ROM) or a random access memory (RAM). The current output circuit 53 supplies an exciting current to the electromagnetic coil 421 of the torque coupling 4. The ECU 5 can obtain various information on the traveling state such as the vehicle speed of the four-wheel-drive vehicle 100, the output torque of the engine 102, the accelerator operation amount, and the brake pedal operation amount (the amount by which a brake pedal is depressed) via, e.g., an in-vehicle communication network such as a controller area network (CAN).

The ECU 5 calculates target torque to be transmitted to the rear wheels 105, based on the obtained information on the traveling state, and controls the torque coupling 4 so that torque according to the target torque is transmitted to the rear wheels 105. The functional configuration and the control method of the ECU 5 will be described in detail below.

Figure 3:
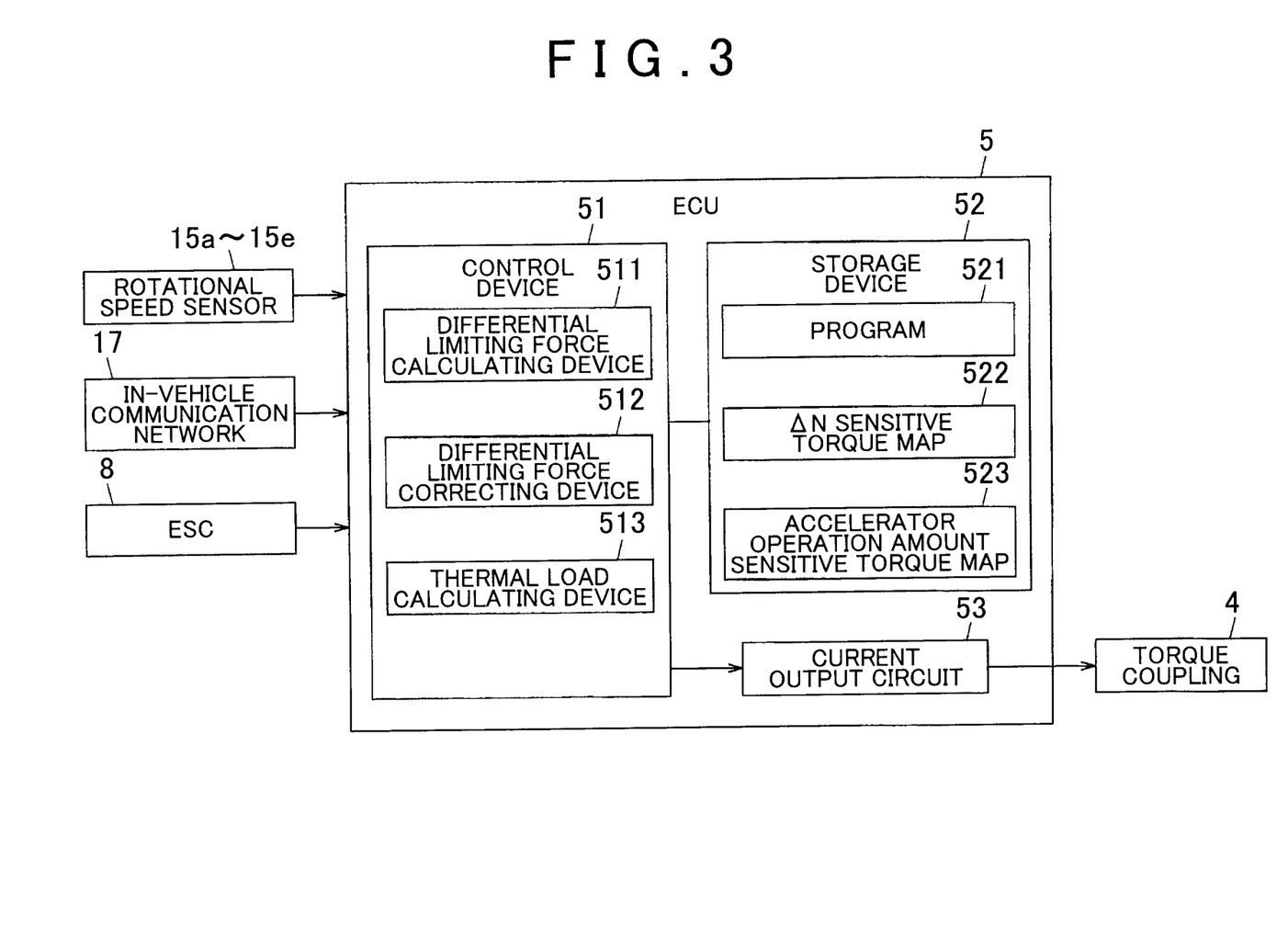
FIG. 3 is a block diagram showing the functional configuration of an ECU.

FIG. 3 is a block diagram showing the functional configuration of the ECU 5. The ECU 5 can detect the rotational speeds of the right and left front wheels 104b, 104a, the right and left rear wheels 105b, 105a, and the propeller shaft 2 by the rotational speed sensors 15a to 15e. The ECU 5 can obtain various information on the traveling state of the four-wheel-drive vehicle 100 via an in-vehicle communication network 17. The ECU 5 is connected to the ESC 8 and can receive command signals from the ESC 8.

As the CPU of the control device 51 of the ECU 5 operates based on a program 521 stored in the storage device 52, the control device 51 functions as a differential limiting force calculating device 511, a differential limiting force correcting device 512, and a thermal load calculating device 513. The storage device 52 stores therein a ΔN sensitive torque map 522 and an accelerator operation amount sensitive torque map 523 which are referred to by the CPU of the control device 51 when the control device 51 operates as the differential limiting force calculating device 511. The current output circuit 53 has, e.g., a switching element such as a power transistor, and outputs a current according to the target torque to the torque coupling 4 by pulse width modulation (PWM) control that is performed by the control device 51.

The control device 51 of the ECU 5 generally performs the following processing as the differential limiting force calculating device 511, the differential limiting force correcting device 512, and the thermal load calculating device 513. The differential limiting force calculating device 511 calculates a target value of the differential limiting force that limits the differential operation of the front and rear wheels 104, 105 (the torque that is transmitted by the torque coupling 4), based on the vehicle traveling state obtained by the rotational speed sensors 15a to 15e and the in-vehicle communication network 17. The differential limiting force correcting device 512 makes a correction according to a command from the ESC 8 to reduce the target value of the differential limiting force which has been calculated by the differential limiting force calculating device 511. The thermal load calculating device 513 calculates a thermal load of the torque coupling 4.

A specific example of processing that is performed by the control device 51 will be described with reference to FIG. 4A and FIG. 4B. FIG. 4A and FIG. 4B is a flowchart showing a series of steps including processes that are performed by the control device 51 as the differential limiting force calculating device 511, the differential limiting force correcting device 512, and the thermal load calculating device 513. The control device 51 repeatedly performs the processing shown in the flowchart of FIG. 4A and FIG. 4B in a predetermined control period.

The control device 51 first calculates a thermal load HE of the torque coupling 4 (step S10). For example, the thermal load HE can be obtained by accumulating the heating quantity which is obtained by subtracting the amount of heat dissipation from heat generation. The heat generation. is obtained by multiplying the torque that is transmitted by the torque coupling 4 in the four-wheel-drive state by the difference in rotational speed between the front and rear wheels 104, 105. The heat dissipation is obtained in view of the ambient temperature and the vehicle speed. In the case where the torque coupling 4 is provided with a temperature sensor, the thermal load HE may be obtained based on the detection value of the temperature sensor. Step S10 is a process that is performed by the control device 51 as the thermal load calculating device 513.

Next, the control device 51 determines if an overheat protection flag F is on (F=1) (step S11). The overheat protection flag F is a flag indicating that overheat protection control is in operation. The overheat protection control is a process that is performed when it is detected that the torque coupling 4 is in an overheat state. In the overheat protection control, the torque that is transmitted by the torque coupling 4 is reduced to zero until the thermal load of the torque coupling 4 becomes equal to a predetermined value or less. In the present embodiment, the overheat protection flag F is set (on) or cleared (off) in steps S13, S15 described below.

If the overheat protection flag F is on (S11: Yes), it is determined if the thermal load HE calculated in step S10 is equal to or less than a first threshold value HE1 (step S12). The first threshold value HE1 is a threshold value that is used to determine that the thermal load of the torque coupling 4 has been sufficiently reduced by the overheat protection control after detection of the torque coupling 4 being in the overheat state. If the thermal load HE is equal to or less than the first threshold value HE1 in step S12 (S12: Yes), the control device 51 clears the overheat protection flag F (F=0) (step S13). If the thermal load HE is larger than the first threshold value HE1 in step S12 (S12: No), the control device 51 sets the target torque T to zero (step S16) and continues the overheat protection control.

If the overheat protection flag F is off in step S11 (S11: No), the control device 51 determines if the thermal load HE calculated in step S10 is equal to or larger than an overheat determination threshold value HE0 (step S14). The overheat determination threshold value HE0 is a threshold value that is used to detect that the torque coupling 4 is in the overheat state, and is significantly larger than the first threshold value HE1. If the thermal load HE is equal to or larger than the overheat determination threshold value HE0 (S14: Yes), the control device 51 sets the overheat protection flag F (F=1) (step S15) and sets the target torque T to zero (step S16).

If the thermal load HE is smaller than the overheat determination threshold value HE0 in step S14 (S14: No), or if the thermal load HE is equal to or smaller than the first threshold value HE1 in step S12 (S12: Yes), the control device 51 calculates the target torque T (step S17).

The process of calculating the target torque T in step S17 is a process that is performed by the control device 51 as the differential limiting force calculating device 511. In the present embodiment, the control device 51 calculates the target torque T by the sum of first torque T1 obtained by referring to the ΔN sensitive torque map 522 and second torque T2 obtained by referring to the accelerator operation amount sensitive torque map 523.

In the ΔN sensitive torque map 522, characteristics are defined in which the first torque T1 is set to a larger value as an absolute value of the difference in rotational speed between the front and rear wheels (ΔN) increases. In the accelerator operation amount sensitive torque map 523, characteristics are defined in which the second torque T2 is set to a larger value as the accelerator operation amount (the amount by which the accelerator pedal is depressed) by the driver increases. That is, the control device 51 calculates the target torque T based on the vehicle traveling state obtained by the rotational speed sensors 15a to 15e and the in-vehicle communication network 17.

Then, the control device 51 determines if there is a torque command from the ESC 8 (step S18). The ESC 8 may send a torque command to the ECU 5 to limit the target torque T or to set the target torque T to zero when the ESC 8 is performing vehicle behavior stabilization control by adjusting a braking force. That is, the ESC 8 sends a torque command to the ECU 5 in the case where desired vehicle behavior stabilization may not be achieved by controlling a braking force as the differential operation of the front and rear wheels 104, 105 is limited by the torque coupling 4.

If there is a torque command from the ESC 8 (S18: Yes), the control device 51 performs steps S19 to S25 described below. If there is no torque command from the ESC 8 (S18: No), the control device 51 does not perform steps S19 to S25. Steps S19 to S25 are a process of making a correction to reduce the target torque T based on a command from the ESC 8, and are a process that is performed by the control device 51 as the differential limiting force correcting device 512.

If there is a torque command from the ESC 8 (S18: Yes), the control device 51 determines if the driver of the four-wheel-drive vehicle 100 is performing a braking operation (brake operation) (step S19). If the driver is not performing a braking operation (S19: No), the control device 51 determines if the driver of the four-wheel-drive vehicle 100 is performing an accelerator operation, namely if an accelerator pedal is being depressed even slightly (step S20). For example, this determination can be made by whether the amount by which the accelerator pedal is depressed is equal to or larger than a predetermined value Acc1 close to zero. If the driver is performing an accelerator operation (S20: Yes), the control device 51 determines if the vehicle speed V of the four-wheel-drive vehicle 100 is equal to or lower than a predetermined value V1 (step S21). If the vehicle speed V is equal to or lower than the predetermined value V1 (S21: Yes), the control device 51 determines if the thermal load HE calculated in step S10 is equal to or larger than a second threshold value HE2 (step S22).

If the thermal load HE is equal to or larger than the second threshold value HE2 (S22: Yes), the control device 51 determines if requested torque R from the ESC 8 is smaller than a predetermined lower limit RT1 (step S23). If the requested torque R is smaller than the lower limit RT1 (S23: Yes), the control device 51 corrects the target torque T to the lower limit RT1 (step S24).

The second threshold value HE2 is a value higher than the first threshold value HE1 and lower than the overheat determination threshold value HE0. The larger the thermal load HE is, the higher the temperature of the torque coupling 4 is. For example, it is desirable to set the lower limit RT1 to at least half Tmax, where Tmax represents a maximum value of the target torque T corresponding to rated torque transmission capacity of the torque coupling 4.

If the driver of the four-wheel-drive vehicle 100 is performing a braking operation (S19: Yes), if the driver of the four-wheel-drive vehicle 100 is not performing an accelerator operation (S20: No), if the vehicle speed V is higher than the predetermined value V1 (S21: No), if the thermal load HE is not equal to or larger than the second threshold value HE2 (S22: No), or if the requested torque R is equal to or larger than the predetermined lower limit RT1 (S23: No), the control device 51 corrects the target torque T to the requested torque R from the ESC 8 (step S25).

The control device 51 controls the current output circuit 53 to output a current to the torque coupling 4 (step S26), the current according to the target torque T calculated in step S17, the target torque T corrected in step S24 or S25, or the target torque T set to zero in step S16, and completes a process for a single control period.

Of steps S10 to S26 in the above method for controlling the torque coupling 4, step S10 corresponds to calculating the thermal load HE of the torque coupling 4 in the present invention, step S17 corresponds to calculating a target value of the differential limiting force that limits the differential operation of the front and rear wheels 104, 105 based on the vehicle traveling state in the present invention. Steps S19 to S25 correspond to making a correction to reduce a target value of the differential limiting force based on a command from the ESC 8 in the present invention. In the correction of the differential limiting force, if the thermal load HE calculated in the calculation of the thermal load is equal to or larger than a predetermined value (second threshold HE2), the control device 51 limits correction of a target value of the differential limiting force based on a command from the ESC 8.

According to the steps described above, if the thermal load HE calculated in step S10 is equal to or larger than the predetermined value (second threshold HE2) (S22: Yes), the control device 51 limits correction of a target value of the differential limiting force (target torque T) based on a command from the ESC 8 (steps S23 to S25). That is, even if a command to make a correction to reduce the target torque T is sent from the ESC 8, the control device 51 does not necessarily make a correction to reduce the target torque T according to this command. If the thermal load HE is equal to or larger than the second threshold HE2 (S22: Yes) and the requested torque R from the ESC 8 is smaller than the predetermined lower limit RT1 (S23: Yes), the control device 51 sets the target torque T to the lower limit RT1.

Accordingly, if the thermal load HE is equal to or larger than the second threshold HE2, the multiple disc clutch 41 of the torque coupling 4 is not disengaged, and differential rotation between the inner and outer clutch plates 411, 412 is suppressed, and the four-wheel-drive state is maintained. More specifically, if the thermal load HE calculated in step S10 is equal to or larger than the second threshold HE2, the control device 51 corrects the target torque T so that the target torque T does not become lower than the lower limit RT1.

If the driver is performing a braking operation (S19: Yes) or if the driver is not performing an accelerator operation (S20: No), the control device 51 does not limit correction of the target torque T based on a command from the ESC 8 even if the thermal load HE is equal to or larger than the second threshold HE2. That is, if the driver is performing a braking operation or if the driver is not performing an accelerator operation, the control device 51 corrects the target torque T to a value requested by the ESC 8 (requested torque R) (step S25). The reason for this is as follows. When the driver is performing a braking operation or when the driver is not performing an accelerator operation, it is clear that the driver intends to decelerate, and stabilizing vehicle behavior is prioritized over maintaining the four-wheel-drive state.

If the vehicle speed V is higher than the predetermined value V1 (S21: No), the control device 51 does not limit correction of the target torque T based on a command from the ESC 8, even if the thermal load HE is equal to or larger than the second threshold value HE2. That is, if the vehicle speed V is higher than the predetermined value V1, the control device 51 corrects the target torque T to a value requested by the ESC 8 (requested torque R) (step S25). The reason for this is as follows. If the vehicle speed V is high, differential rotation between the inner and outer clutch plates 411, 412 of the multiple disc clutch 41 is less likely to become excessive, and it is less necessary to maintain the four-wheel-drive state. For example, it is desirable to set the predetermined value V1 to 30 km/h or less.

The first embodiment described above has the following functions and effects.

(1) If the thermal load HE is equal to a predetermined value (second threshold value HE2), the control device 51 limits correction to reduce the target torque T based on a command from the ESC 8. Accordingly, the four-wheel-drive state is maintained, and differential rotation between the inner and outer clutch plates 411, 412 is suppressed. Heat generation due to frictional sliding between the inner and outer clutch plates 411, 412 is thus suppressed, and an increase in thermal load of the torque coupling 4 can be suppressed. It is therefore possible to avoid the situation where it is necessary to perform the overheat protection control in which the target torque T is set to zero and the torque coupling 4 is cooled. Traveling stability can be maintained during traveling on a low μ road.

(2) The thermal load HE can become higher than the second threshold value HE2 in the situation where it is highly necessary to increase traveling stability by switching the drive state to the four-wheel-drive state as in the case where the driver having a relatively good driving skill is driving on a low μ road or a long uphill slope. In the control of the ECU 5 according to the present embodiment, even if the thermal load HE is larger than the second threshold value HE2, the target torque T is equal to or larger than the lower limit RT1, and the four-wheel-drive state is maintained. Stable traveling according to the driver's intension can thus be implemented.

(3) When the driver is performing a braking operation, the control device 51 does not limit correction of the target torque T based on a command from the ESC 8 even if the thermal load HE is equal to or larger than the second threshold value HE2. This can sufficiently provide effects of the vehicle behavior stabilization control of the ESC 8 when the vehicle is decelerated, is suddenly stopped, etc.

(4) If the vehicle speed V is higher than the predetermined value V1, the control device 51 does not limit correction of the target torque T based on a command from the ESC 8 even if the thermal load HE is equal to or larger than the second threshold value HE2. This can sufficiently provide effects of the vehicle behavior stabilization control of the ESC 8 when the vehicle is traveling at high speeds as the torque coupling 4 is relatively less likely to be in an overheat state.

Figure 5A:
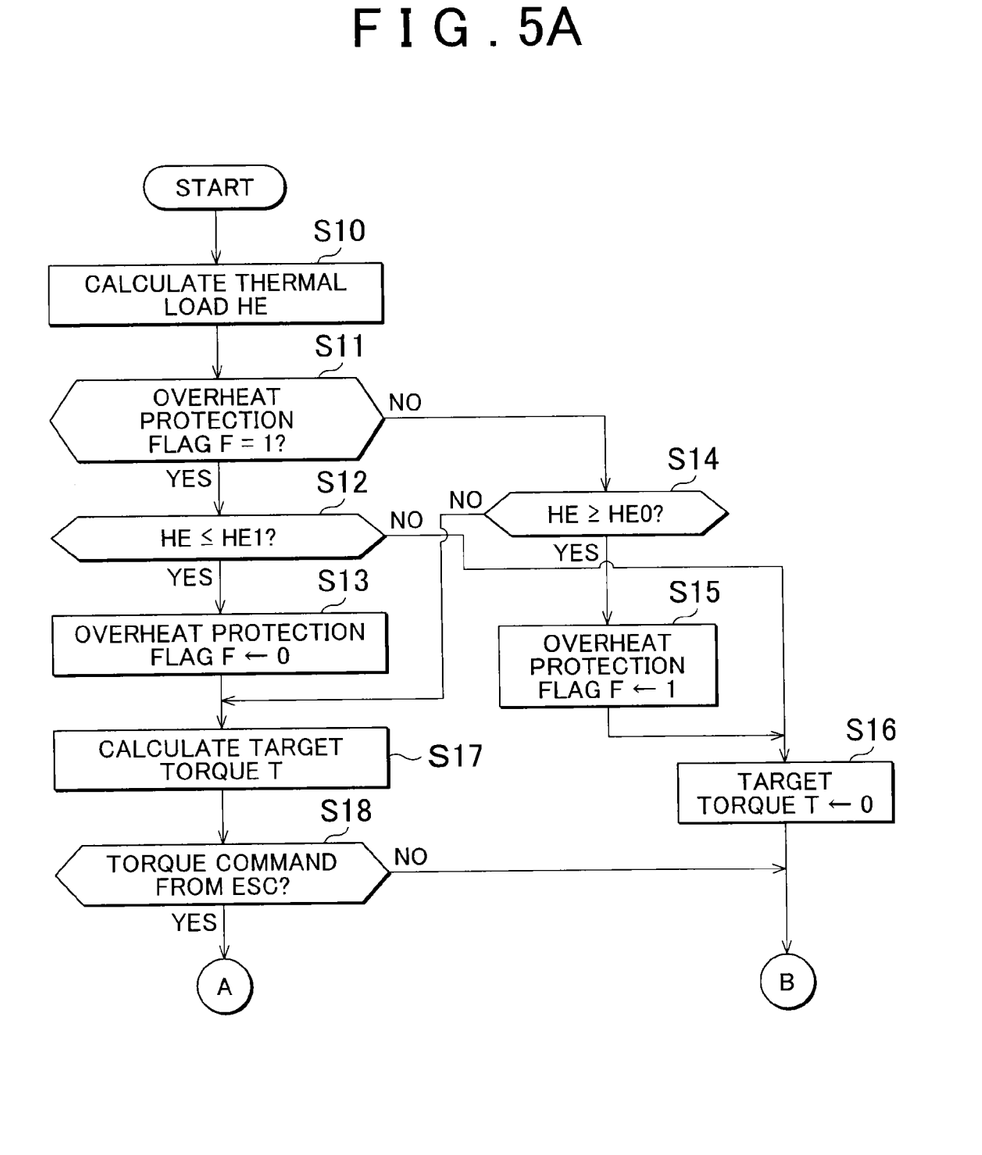
FIG. 5A and FIG. 5B is a flowchart showing processing of an ECU according to a second embodiment.
Figure 5B:
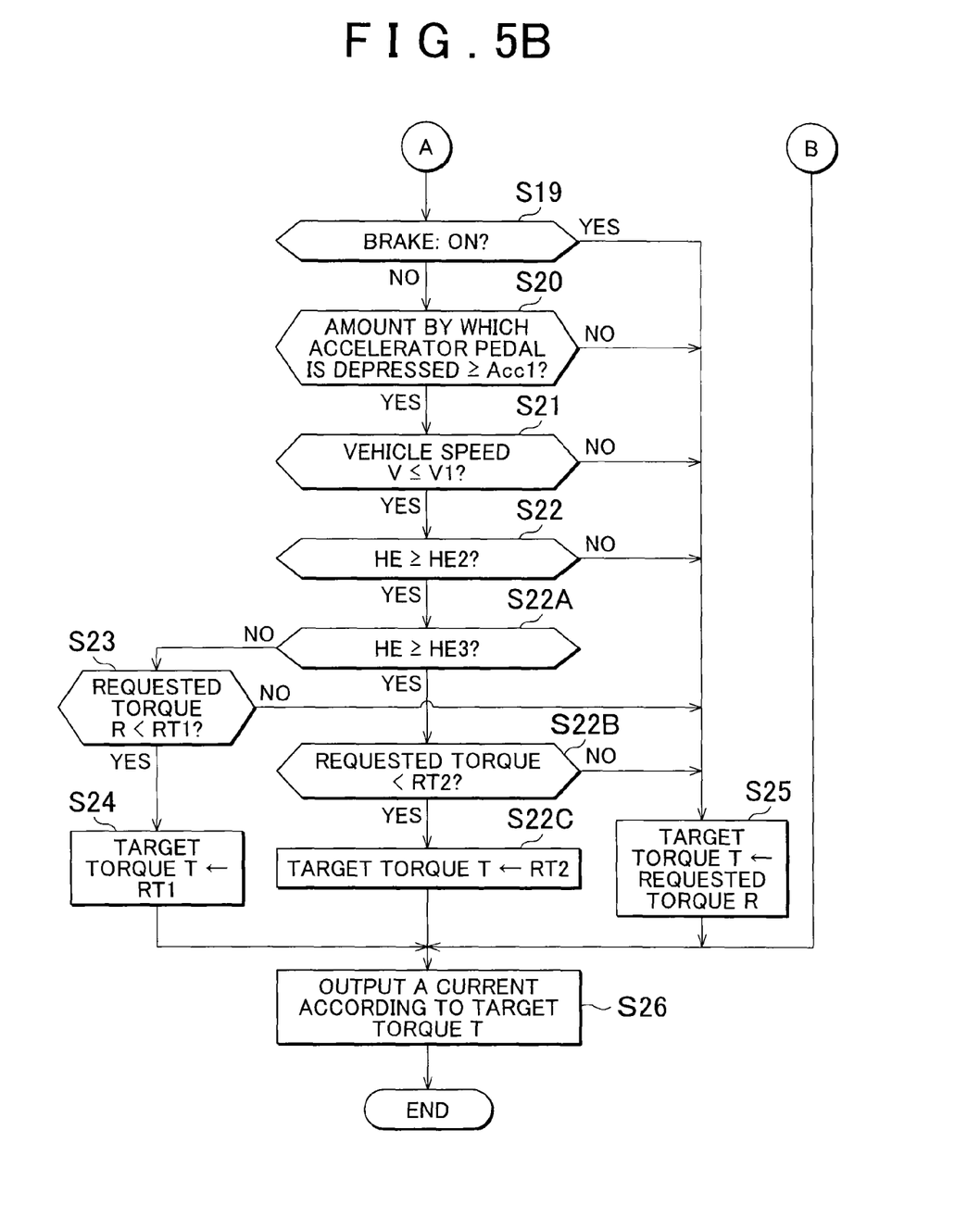

A second embodiment of the present invention will be described below with reference to FIG. 5A and FIG. 5B. FIG. 5A and FIG. 5B is a flowchart showing an example of processing that is performed by the control device 51 of the ECU 5 according to the second embodiment.

Control of the torque coupling 4 by the ECU 5 according to the present embodiment is the same as the first embodiment except that a correction to reduce the target torque T is finely made in a plurality of steps according to the thermal load HE. In FIG. 5A and FIG. 5B, those steps having the same processing as that of the steps of the first embodiment described with respect to FIG. 4A and FIG. 4B are denoted with the same reference characters, and description thereof will not be repeated.

The processing that is performed by the control device 51 of the ECU 5 according to the present embodiment is different from the first embodiment in that steps S22A to S22C are added. That is, in the present embodiment, if the thermal load HE is equal to or larger than the second threshold value HE2 (S22:Yes), the control device 51 determines if the thermal load HE is equal to or larger than a third threshold value HE3 that is higher than the second threshold value HE2 (step S22A).

If the thermal load HE is smaller than the third threshold value HE3 (S22 A: No), the control device 51 determines if the requested torque R from the ESC 8 is smaller than the first lower limit RT1 (step S23). If the requested torque R is smaller than the first lower limit RT1 (S23: Yes), the control device 51 corrects the target torque T to the first lower limit RT1 (step S24).

If the thermal load HE is equal to or larger than the third threshold value HE3 in step S22A (S22A: Yes), the control device 51 determines if the requested torque R from the ESC 8 is smaller than a second lower limit RT2 (step S22B). If the requested torque R is smaller than the second lower limit RT2 (S22B: Yes), the control device 51 corrects the target torque T to the second lower limit RT2 (step S22C). The third threshold value HE3 is larger than the second threshold value HE2, and the second lower limit RT2 is larger than the first lower limit RT1. For example, it is desirable to set the first lower limit RT1 to half the maximum value Tmax of the target torque T, and to set the second lower limit RT2 to a value smaller than the maximum value Tmax of the target torque T and larger than the first lower limit RT1.

If the requested torque R is equal to or larger than the first lower limit RT1 in step S23 (S23: No) or if the requested torque R is equal to or larger than the second lower limit RT2 in step S22B (S22B: No), the control device 51 corrects the target torque T to the requested torque R from the ESC 8 (step S25).

The control device 51 controls the current output circuit 53 to output a current according to the target torque T calculated in step S17, the target torque T corrected in step S24, S22C, or S25, or the target torque T set to zero in step S16 to the torque coupling 4 (step S26).

That is, in the present embodiment, if the thermal load HE is equal to or larger than the first predetermined value (second threshold value HE2) (S22: Yes), the control device 51 corrects the target torque T so that the target torque T does not become lower than the preset first lower limit RT1 (steps S23, S24). If the thermal load HE is equal to or larger than the second predetermined value (third threshold HE3) that is larger than the first predetermined value (second threshold HE2) (S22A: Yes), the control device 51 corrects the target torque T so that the target torque T does not become lower than the second lower limit RT2 that is higher than the first lower limit RT1 (step S22B, S22C).

According to the present embodiment, in addition to the functions and effects described in the first embodiment, a correction to reduce the target torque T is made in a plurality of steps according to the thermal load HE. Accordingly, in urgent situations in which the thermal load of the torque coupling 4 is large, the target torque T is kept at least at a larger value (second lower limit RT2), and an increase in thermal load of the torque coupling 4 can be more reliably suppressed.

Figure 6:
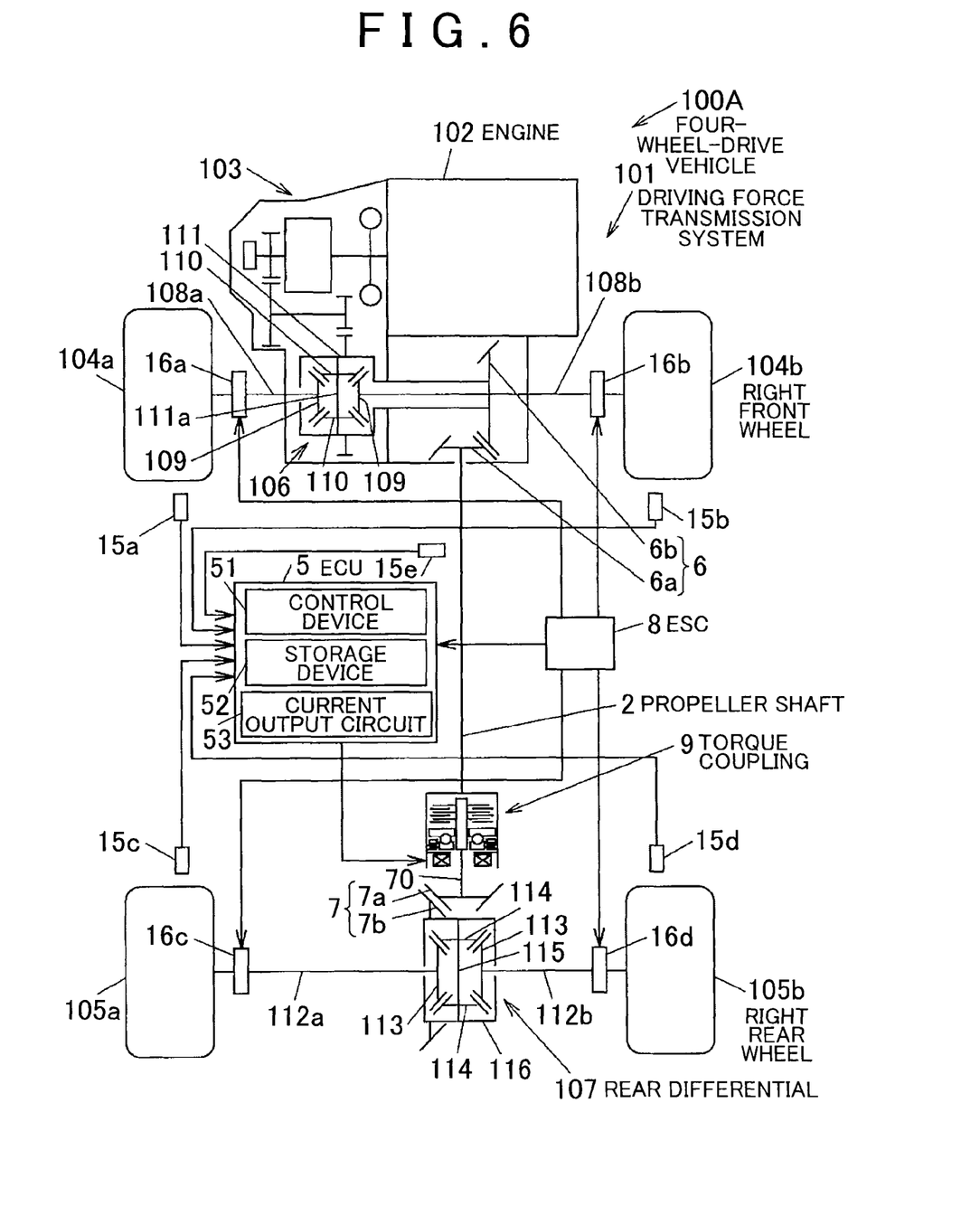
FIG. 6 is a diagram schematically showing an example of the configuration of a four-wheel-drive vehicle having mounted thereon a control device for a limited slip differential according to a third embodiment of the present invention.

A third embodiment of the present invention will be described with reference to FIGS. 6 and 7. The present embodiment is different from the first and second embodiments in the configuration of a four-wheel-drive vehicle 100A. However, the processing that is performed by the control device 51 of the ECU 5 is similar to that described with reference to the flowcharts of FIGS. 4 and 5. In FIG. 6, the same components as those described with reference to FIG. 1 are denoted with the same reference characters, and description thereof will not be repeated.

The four-wheel-drive vehicle 100A according to the present embodiment does not have the dog clutch 3 (see FIG. 1), and the ring gear 6b of the front wheel-side gear mechanism 6 is directly coupled to the front differential case 111 of the front differential 106. The left rear wheel drive shaft 112a is coupled to the left side gear 113 of the rear differential 107 so as not to be rotatable relative to the left side gear 113, and a torque coupling 9 is disposed between the propeller shaft 2 and the rear differential 107.

More specifically, the torque coupling 9 is disposed between a pinion gear shaft 70 having the pinion gear 7a of the rear wheel-side gear mechanism 7 at its one end and the rear end of the propeller shaft 2, and the amount of torque that is transmitted from the propeller shaft 2 to the pinion gear shaft 70 can be adjusted by the torque coupling 9. As the amount of torque that is transmitted by the torque coupling 9 increases, the differential operation of the front and rear wheels 104, 105 is limited.

The torque coupling 9 transmits the torque according to a current supplied from the current output circuit 53 of the ECU 5 from the propeller shaft 2 to the pinion gear shaft 70. The configuration of the torque coupling 9 will be described below.

Figure 7:
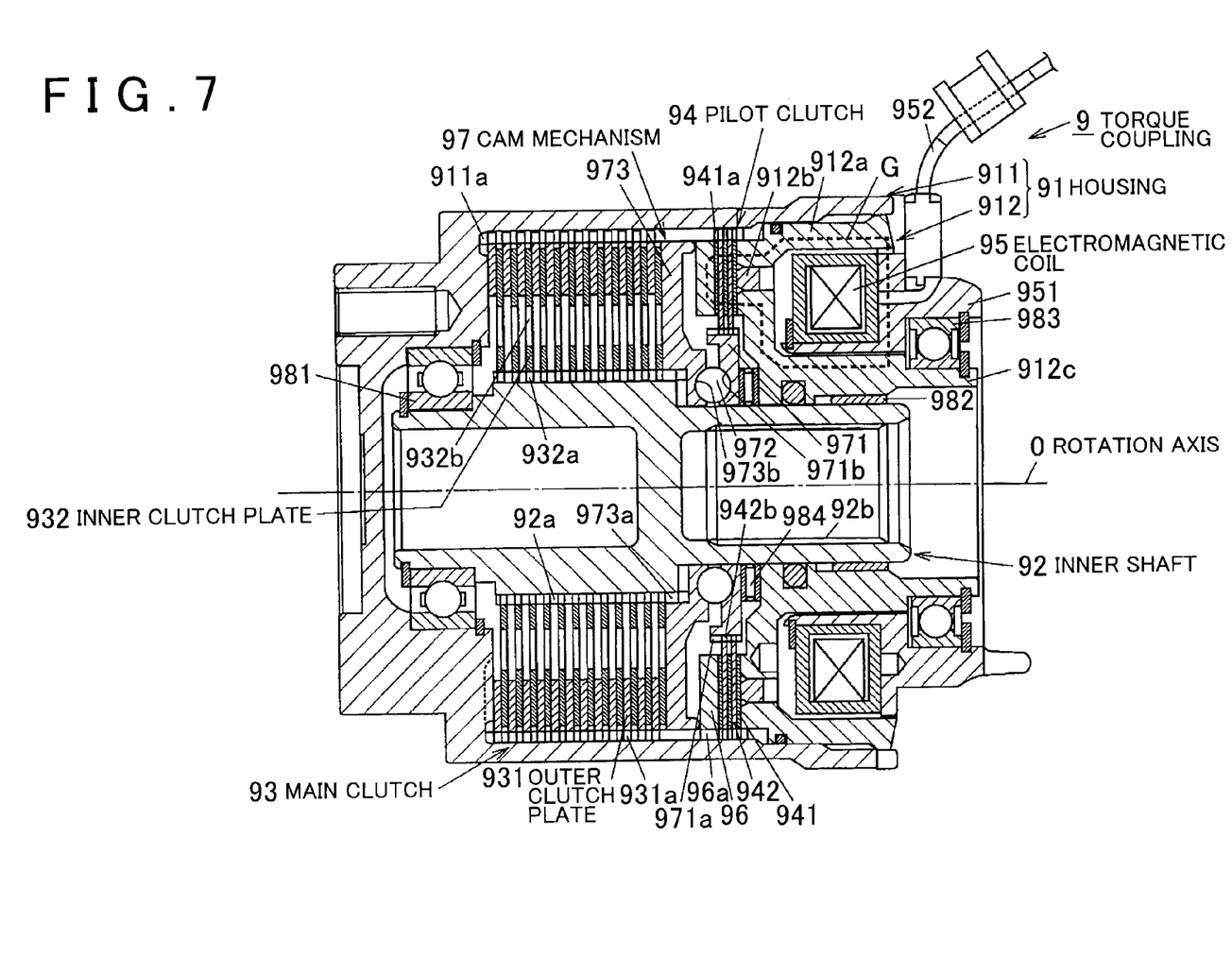
FIG. 7 is a schematic configuration diagram showing a torque coupling and its surrounding area according to a third embodiment.

FIG. 7 is a sectional view showing an example of the configuration of the torque coupling 9. The torque coupling 9 is generally formed by a housing 91, an inner shaft 92, a main clutch 93, a pilot clutch 94, an electromagnetic coil 95, an armature 96, and a cam mechanism 97. The housing 91 is coupled to the propeller shaft 2. The inner shaft 92 is supported so as to be rotatable relative to the housing 91. The main clutch 93 is disposed between the inner peripheral surface of the housing 91 and the outer peripheral surface of the inner shaft 92. The pilot clutch 94 is placed next to the main clutch 93 in the axial direction. The electromagnetic coil 95 and the armature 96 apply a pressing force in the axial direction to the pilot clutch 94. The cam mechanism 97 converts a rotating force of the housing 91 which is transmitted by the pilot clutch 94 to a pressing force of the main clutch 93.

The housing 91 is formed by a bottomed cylindrical front housing 911 and an annular rear housing 912. The annual rear housing 912 is coupled to the front housing 911 by screwing etc. so as to rotate together with the front housing 911. A plurality of spline teeth 911a are formed on the inner peripheral surface of the front housing 911 so as to be arranged along a rotation axis O. The rear housing 912 is formed by first to third members 912a, 912b, 912c. The first member 912a is made of a magnetic material and is coupled to the front housing 911. The second member 912b is made of a nonmagnetic material and is integrally coupled to the inner periphery of the first member 912a. The third member 912c is made of a magnetic material and is integrally coupled to the inner periphery of the second member 912b.

The inner shaft 92 is supported on the inner periphery of the housing 91 by a ball bearing 981 and a needle roller bearing 982. A plurality of spline teeth 92a are formed on the outer peripheral surface of the inner shaft 92 so as to be arranged along the rotation axis O. A plurality of spline teeth 92b are formed on the inner peripheral surface of the inner shaft 92 in order to couple a shaft portion of the pinion gear shaft 70 (see FIG. 6) to the inner shaft 92 so that the shaft portion of the pinion gear shaft 70 is not rotatable relative to the inner shaft 92.

The main clutch 93 is a multiple disc clutch having a plurality of outer clutch plates 931 and a plurality of inner clutch plates 932 which are alternately arranged along the rotation axis O. The outer clutch plates 931 have a plurality of projections 931a that engage with the plurality of spline teeth 911a of the front housing 911. The outer clutch plates 931 are not rotatable relative to the front housing 911 and are movable in the axial direction relative to the front housing 911. The inner clutch plates 932 have a plurality of projections 932a that engage with the plurality of spline teeth 92a of the inner shaft 92. The inner clutch plates 932 are not rotatable relative to the inner shaft 92 and are movable in the axial direction relative to the inner shaft 92.

The pilot clutch 94 is a wet multiple disc clutch having a plurality of outer clutch plate 941 and a plurality of inner clutch plates 942 which are alternately arranged along the rotation axis O. The outer clutch plates 941 have a plurality of projections 941a that engage with the plurality of spline teeth 911a of the front housing 911. The outer clutch plates 941 are not rotatable relative to the front housing 911 and are movable in the axial direction relative to the front housing 911. The inner clutch plates 942 have a plurality of projections 942b that engage with a plurality of spline teeth 971a formed on the outer peripheral surface of a pilot cam 971 of the cam mechanism 97 described below. The inner clutch plates 942 are not rotatable relative to the pilot cam 971 and are movable in the axial direction relative to the pilot cam 971.

The cam mechanism 97 has the pilot cam 971, a main cam 973, and a plurality of spherical cam balls 972. The main cam 973 presses the main clutch 93 in the axial direction. The plurality of cam balls 972 are disposed between the pilot cam 971 and the main cam 973. Spline teeth 973a formed on the inner peripheral surface of the main cam 973 mesh with the plurality of spline teeth 92a of the inner shaft 92, which restricts relative rotation between the main cam 973 and the inner shaft 92. A needle roller thrust bearing 984 is disposed between the pilot cam 971 and the third member 912c of the rear housing 912.

A plurality of cam grooves 971b, 973b are formed in the opposing surfaces of the pilot cam 971 and the main cam 973 such that the depths in the axial direction of the cam grooves 971b, 973b vary in the circumferential direction. As the cam balls 972 roll in the cam grooves, the cam mechanism 97 generates axial thrust that presses the main cam 973 against the main clutch 93.

The electromagnetic coil 95 is held by a yoke 951 supported by the third member 912c via a ball bearing 983. The electromagnetic coil 95 is placed on the opposite side of the rear housing 912 from the pilot clutch 94. An exciting current is supplied from the current output circuit 53 (see FIG. 1) of the control device 51 to the electromagnetic coil 95 via an electric wire 952.

The armature 96 is made of an annular magnetic material and is placed so as to interpose the pilot clutch 94 between the armature 96 and the rear housing 912 and so as to be movable in the axial direction. A plurality of spline teeth 96a that engage with the plurality of spline teeth 911a of the front housing 911 are formed on the outer peripheral surface of the armature 96.

In the torque coupling 9 configured as described above, when an exciting current is supplied from the current output circuit 53 of the ECU 5 to the electromagnetic coil 95, magnetic flux is generated in a magnetic path G passing through the yoke 951, the first and third members 912a, 912c of the rear housing 912, the pilot clutch 94, and the armature 96. The armature 96 is attracted toward the rear housing 912 by the magnetic force of this magnetic flux, thereby pressing the pilot clutch 94.

The outer clutch plates 941 and the inner clutch plates 942 of the pilot clutch 94 thus frictionally slide on each other, a rotating force of the housing 91 is transmitted to the pilot cam 971 of the cam mechanism 97 via the pilot clutch 94, and the pilot cam 971 rotates relative to the main cam 973. Due to the relative rotation between the pilot cam 971 and the main cam 973, the cam balls 972 roll in the cam grooves 971b, 973b, generating axial thrust in a direction in which the pilot cam 971 and the main cam 973 are separated from each other. Due to this thrust of the cam mechanism 97, the main clutch 93 is pressed by the main cam 973, and torque is transmitted from the propeller shaft 2 to the pinion gear shaft 70 by the friction between the plurality of outer clutch plates 941 and the plurality of inner clutch plates 942.

The present embodiment has functions and effects similar to those of the first and second embodiments.

Although the device and the method for controlling a limited slip differential according to the present invention are described above based on the first to third embodiments, the present invention is not limited to these embodiments, and can be carried out in various forms without departing from the spirit and scope of the invention.

For example, each of the above embodiments is described with respect to the case where the rotational speed sensors 15a to 15e are connected to the ECU 5.

However, the present invention is not limited to this. The rotational speed sensors 15a to 15e may be connected to the ESC 8, and the ECU 5 may obtain detection signals of the rotational speed sensors 15a to 15e via an in-vehicle communication network such as CAN.

The second embodiment is described with respect to the case where a correction to reduce the target torque T is made in two steps according to the thermal load HE. However, the correction to reduce the target torque T may be made in three or more steps. Alternatively, the correction to reduce the target torque T may be continuously steplessly limited.

What is claimed is:

1. A control device for a limited slip differential, which is mounted on a vehicle including a vehicle behavior control device that controls behavior of the vehicle by controlling a braking force that is applied to front and rear wheels, and the limited slip differential that is capable of limiting a differential operation of the front and rear wheels, and which controls the limited slip differential, the control device comprising:
    a differential limiting force calculating device that calculates a target value of a differential limiting force that limits the differential operation of the front and rear wheels based on a vehicle traveling state;
    a differential limiting force correcting device that makes a correction to reduce the target value of the differential limiting force calculated by the differential limiting force calculating device, based on a command from the vehicle behavior control device; and
    a thermal load calculating device that calculates a thermal load of the limited slip differential; wherein
    the differential limiting force correcting device limits the correction of the target value of the differential limiting force based on the command from the vehicle behavior control device, when the thermal load calculated by the thermal load calculating device is equal to or larger than a predetermined value.

2. The control device for the limited slip differential according to claim 1, wherein
    when the thermal load calculated by the thermal load calculating device is equal to or larger than the predetermined value, the differential limiting force correcting device corrects the target value of the differential limiting force so that the target value of the differential limiting force does not become lower than a predetermined lower limit.

3. The control device for the limited slip differential according to claim 2, wherein
    when a driver of the vehicle is performing a braking operation, the differential limiting force correcting device does not limit the correction of the target value of the differential limiting force based on the command from the vehicle behavior control device even if the thermal load calculated by the thermal load calculating device is equal to or larger than the predetermined value.

4. The control device for the limited slip differential according to claim 1, wherein
    when a driver of the vehicle is performing a braking operation, the differential limiting force correcting device does not limit the correction of the target value of the differential limiting force based on the command from the vehicle behavior control device even if the thermal load calculated by the thermal load calculating device is equal to or larger than the predetermined value.

5. The control device for the limited slip differential according to claim 4, wherein
when the driver of the vehicle is not performing an accelerator operation, the differential limiting force correcting device does not limit the correction of the target value of the differential limiting force based on the command from the vehicle behavior control device even if the thermal load calculated by the thermal load calculating device is equal to or larger than the predetermined value.

6. The control device for the limited slip differential according to claim 1, wherein
when the driver of the vehicle is not performing an accelerator operation, the differential limiting force correcting device does not limit the correction of the target value of the differential limiting force based on the command from the vehicle behavior control device even if the thermal load calculated by the thermal load calculating device is equal to or larger than the predetermined value.

7. The control device for the limited slip differential according to claim 6, wherein
when a vehicle speed of the vehicle is larger than a predetermined value, the differential limiting force correcting device does not limit the correction of the target value of the differential limiting force based on the command from the vehicle behavior control device even if the thermal load calculated by the thermal load calculating device is equal to or larger than the predetermined value.

8. The control device for the limited slip differential according to claim 1, wherein
when a vehicle speed of the vehicle is larger than a predetermined value, the differential limiting force correcting device does not limit the correction of the target value of the differential limiting force based on the command from the vehicle behavior control device even if the thermal load calculated by the thermal load calculating device is equal to or larger than the predetermined value.

9. The control device for the limited slip differential according to claim 8, wherein
when the thermal load calculated by the thermal load calculating device is equal to or larger than a first predetermined value, the differential limiting force correcting device corrects the target value of the differential limiting force so that the target value of the differential limiting force does not become lower than a preset first lower limit, and when the thermal load is equal to or larger than a second predetermined value that is larger than the first predetermined value, the differential limiting force correcting device corrects the target value of the differential limiting force so that the target value of the differential limiting force does not become lower than a second lower limit that is larger than the first lower limit.

10. The control device for the limited slip differential according to claim 1, wherein
when the thermal load calculated by the thermal load calculating device is equal to or larger than a first predetermined value, the differential limiting force correcting device corrects the target value of the differential limiting force so that the target value of the differential limiting force does not become lower than a preset first lower limit, and when the thermal load is equal to or larger than a second predetermined value that is larger than the first predetermined value, the differential limiting force correcting device corrects the target value of the differential limiting force so that the target value of the differential limiting force does not become lower than a second lower limit that is larger than the first lower limit.

11. A control method for controlling a limited slip differential that limits a differential operation of front and rear wheels to which a driving force of a driving source of a four-wheel-drive vehicle is distributed, the method comprising:
calculating a target value of a differential limiting force that limits the differential operation of the front and rear wheels based on a vehicle traveling state;
making a correction to reduce the calculated target value of the differential limiting force, based on a command from a vehicle behavior control device that controls behavior of the vehicle by controlling a braking force that is applied to the front and rear wheels; and,
calculating a thermal load of the limited slip differential; wherein
in the correction to reduce the calculated target value of the differential limiting force the correction of the target value of the differential limiting force based on the command from the vehicle behavior control device is limited when the thermal load calculated in the calculation of the thermal load is equal to or larger than a predetermined value.

* * * * *